United States Patent
Zhang

(10) Patent No.: US 10,920,422 B2
(45) Date of Patent: Feb. 16, 2021

(54) HOLLOW PIPE-SANDWICHING METAL PLATE AND APPLICATIONS THEREOF

(71) Applicant: Yue Zhang, Hunan (CN)

(72) Inventor: Yue Zhang, Hunan (CN)

( * ) Notice: Subject to any disclaimer, the term of this patent is extended or adjusted under 35 U.S.C. 154(b) by 0 days.

(21) Appl. No.: 15/774,951

(22) PCT Filed: Sep. 26, 2017

(86) PCT No.: PCT/CN2017/103301
§ 371 (c)(1),
(2) Date: May 9, 2018

(87) PCT Pub. No.: WO2018/076984
PCT Pub. Date: May 3, 2018

(65) Prior Publication Data
US 2018/0328037 A1    Nov. 15, 2018

(30) Foreign Application Priority Data

Oct. 31, 2016  (CN) .......................... 2016 1 0967446
Feb. 8, 2017   (CN) .......................... 2017 1 0069311
(Continued)

(51) Int. Cl.
*E04C 2/32*   (2006.01)
*B32B 15/04*  (2006.01)
(Continued)

(52) U.S. Cl.
CPC .............. *E04C 2/32* (2013.01); *B23K 1/0008* (2013.01); *B23K 1/0014* (2013.01); *B32B 3/12* (2013.01);
(Continued)

(58) Field of Classification Search
CPC ... E04C 2/32; E04C 2/30; B32B 15/00; B32B 3/12
(Continued)

(56) References Cited

U.S. PATENT DOCUMENTS 1,465,653 A * 8/1923 Olander .................... E04C 2/36
                                                        52/382
2,837,788 A * 6/1958 Mazzocco ................. E04C 2/34
                                                       52/789.1
(Continued)

FOREIGN PATENT DOCUMENTS

CN    1748486 A  *  3/2006
CN    1748486 A      3/2006
(Continued)

OTHER PUBLICATIONS

Translation 15774951_Foreign_Reference_2018-08-09.pdf (Year: 2006).*
(Continued)

*Primary Examiner* — Patrick J Maestri
*Assistant Examiner* — Joseph J. Sadlon

(57) ABSTRACT

Disclosed are a hollow pipe-sandwiching metal plate and applications thereof. The hollow pipe-sandwiching metal plate comprises a first panel, a second panel, and multiple hollow pipes between the first panel and the second panel; gaps are arranged among the hollow pipes, and the hollow pipes are connected to the first panel and the second panel by brazing. The present disclosure further includes the applications of the hollow pipe-sandwiching metal plate. The hollow pipe-sandwiching metal plate has advantages, such as light weight, high strength, low stress, high temperature resistance, pressure bearing, thermal insulation and vibration isolation. The metal plate will not deform due to thermal difference, thereby providing permanent service life of the metal plate.

15 Claims, 14 Drawing Sheets

(30) Foreign Application Priority Data

| Jun. 19, 2017 | (CN) | .......................... 2017 1 0465352 |
| Jul. 27, 2017 | (CN) | .......................... 2017 1 0621594 |
| Jul. 27, 2017 | (CN) | .......................... 2017 1 0621595 |
| Aug. 16, 2017 | (CN) | .......................... 2017 1 0700964 |

(51) Int. Cl.

| *B32B 3/12* | (2006.01) |
| *E04C 2/36* | (2006.01) |
| *B32B 15/00* | (2006.01) |
| *B23K 1/00* | (2006.01) |
| *E04C 2/08* | (2006.01) |
| *E04C 2/34* | (2006.01) |
| *B32B 3/20* | (2006.01) |
| *E04B 1/74* | (2006.01) |

(52) U.S. Cl.
CPC ................ *B32B 3/20* (2013.01); *B32B 15/00* (2013.01); *B32B 15/043* (2013.01); *E04C 2/08* (2013.01); *E04C 2/34* (2013.01); *E04C 2/365* (2013.01); *E04B 2001/748* (2013.01)

(58) Field of Classification Search
USPC ...................................................... 52/783.1
See application file for complete search history.

(56) References Cited

U.S. PATENT DOCUMENTS

| 3,061,054 | A | * | 10/1962 | Simmonds | ............ | B25B 27/143 |
| | | | | | | 52/787.1 |
| 3,072,225 | A | * | 1/1963 | Long | ............... | B21D 47/00 |
| | | | | | | 156/197 |
| 3,328,218 | A | * | 6/1967 | Noyes | ................ | E04C 2/34 |
| | | | | | | 156/166 |
| 3,355,850 | A | * | 12/1967 | Rohe | ................ | F16B 39/34 |
| | | | | | | 52/787.1 |
| 3,490,187 | A | * | 1/1970 | Stauffer | ................ | E04C 2/34 |
| | | | | | | 52/481.1 |
| 3,526,072 | A | * | 9/1970 | Campbell | ................ | F16B 5/01 |
| | | | | | | 52/787.1 |
| 3,664,906 | A | * | 5/1972 | Hartig | ................ | B29C 43/305 |
| | | | | | | 428/116 |
| 4,012,882 | A | * | 3/1977 | Juriss | ................ | C22C 27/04 |
| | | | | | | 52/793.11 |
| 4,034,135 | A | * | 7/1977 | Passmore | ................ | B32B 3/28 |
| | | | | | | 428/184 |
| 4,087,302 | A | * | 5/1978 | Wootten | ................ | B21D 13/04 |
| | | | | | | 156/204 |
| 4,257,998 | A | * | 3/1981 | Diepenbrock, Jr. | .... | B29C 33/52 |
| | | | | | | 264/156 |
| 4,317,503 | A | * | 3/1982 | Soderquist | ................ | B32B 3/26 |
| | | | | | | 181/290 |
| 4,348,848 | A | * | 9/1982 | Denzer | ................ | B28B 23/028 |
| | | | | | | 52/432 |
| 4,470,357 | A | * | 9/1984 | Sanzaro | ................ | B32B 15/10 |
| | | | | | | 109/84 |
| 4,489,234 | A | * | 12/1984 | Harnden, Jr. | ............. | B32B 3/12 |
| | | | | | | 392/408 |
| 4,572,700 | A | * | 2/1986 | Mantarro | ............ | E01C 11/225 |
| | | | | | | 210/486 |
| 5,014,814 | A | * | 5/1991 | Focke | ................ | G01B 7/08 |
| | | | | | | 181/200 |
| 5,116,689 | A | * | 5/1992 | Castro | ................ | B23K 1/0014 |
| | | | | | | 428/593 |
| 5,188,879 | A | * | 2/1993 | Hill | ................ | B29C 44/08 |
| | | | | | | 428/117 |
| 5,197,244 | A | * | 3/1993 | Takeda | ................ | E04F 15/02405 |
| | | | | | | 52/126.5 |
| 5,360,500 | A | * | 11/1994 | Evans | ................ | B29D 24/008 |
| | | | | | | 156/74 |
| 5,373,661 | A | * | 12/1994 | Furukawa | ............... | E01C 13/02 |
| | | | | | | 47/65.9 |
| 5,433,151 | A | * | 7/1995 | Ohara | ................ | B61D 17/04 |
| | | | | | | 105/397 |
| 5,445,861 | A | * | 8/1995 | Newton | ................ | B32B 3/12 |
| | | | | | | 428/116 |
| 5,487,930 | A | * | 1/1996 | Lockshaw | ................ | B32B 3/12 |
| | | | | | | 428/53 |
| 5,492,069 | A | * | 2/1996 | Alexander | ................ | B65D 19/40 |
| | | | | | | 108/56.3 |
| 5,716,693 | A | * | 2/1998 | Pittman | ................ | B32B 3/20 |
| | | | | | | 428/178 |
| 5,738,924 | A | * | 4/1998 | Sing | ................ | B32B 3/12 |
| | | | | | | 428/68 |
| 5,741,571 | A | * | 4/1998 | Bowerman | ........... | B23K 11/008 |
| | | | | | | 428/178 |
| 5,797,235 | A | * | 8/1998 | Bowerman | ............ | B23K 31/02 |
| | | | | | | 52/582.1 |
| 6,004,652 | A | * | 12/1999 | Clark | ................ | B32B 3/266 |
| | | | | | | 428/133 |
| 6,055,790 | A | * | 5/2000 | Lunde | ................ | E04C 2/365 |
| | | | | | | 52/787.1 |
| 6,187,401 | B1 | * | 2/2001 | Heisel | ................ | B32B 3/20 |
| | | | | | | 428/36.9 |
| 6,297,489 | B1 | * | 10/2001 | Suyama | ................ | H01J 43/04 |
| | | | | | | 250/207 |
| 6,412,243 | B1 | * | 7/2002 | Sutelan | ................ | B29C 44/12 |
| | | | | | | 428/182 |
| 6,537,005 | B1 | * | 3/2003 | Denham | ............. | F16B 19/1054 |
| | | | | | | 411/42 |
| 6,817,586 | B1 | * | 11/2004 | Lin | .................... | B65D 19/0026 |
| | | | | | | 248/346.02 |
| 6,834,469 | B2 | * | 12/2004 | Fingerson | ............... | E04H 12/24 |
| | | | | | | 52/309.11 |
| 7,575,796 | B2 | * | 8/2009 | Scott | ................ | B32B 7/02 |
| | | | | | | 267/153 |
| 7,721,404 | B2 | * | 5/2010 | Park | ................ | B21D 47/00 |
| | | | | | | 29/463 |
| 7,958,681 | B2 | * | 6/2011 | Moller, Jr. | ................ | E01O 5/20 |
| | | | | | | 52/181 |
| 8,097,106 | B2 | * | 1/2012 | Hand | ................ | B32B 3/12 |
| | | | | | | 156/249 |
| 8,141,723 | B2 | * | 3/2012 | Whalen | ................ | A47B 47/045 |
| | | | | | | 211/135 |
| 8,176,635 | B2 | * | 5/2012 | Queheillalt | ............. | B21C 29/04 |
| | | | | | | 29/897.31 |
| 8,251,625 | B2 | * | 8/2012 | Zimmer | ................ | F16B 13/142 |
| | | | | | | 405/259.5 |
| 8,403,007 | B1 | * | 3/2013 | Marinelli | ................ | F16L 55/168 |
| | | | | | | 138/97 |
| 8,490,365 | B2 | * | 7/2013 | Mueller | ................ | B32B 3/12 |
| | | | | | | 244/123.13 |
| 8,528,299 | B2 | * | 9/2013 | Cove | ................ | B29C 65/08 |
| | | | | | | 52/745.21 |
| 8,590,247 | B2 | * | 11/2013 | Cooke | ................ | F16B 21/02 |
| | | | | | | 52/125.1 |
| 8,615,956 | B2 | * | 12/2013 | Valente | ................ | B32B 3/266 |
| | | | | | | 52/633 |
| 8,628,067 | B2 | * | 1/2014 | Pearce | ................ | A47C 27/144 |
| | | | | | | 267/142 |
| 9,586,363 | B2 | * | 3/2017 | Siboni | ................ | B29C 65/4815 |
| 9,664,396 | B2 | * | 5/2017 | Berchtold | ................ | E04B 1/74 |
| 9,802,241 | B2 | * | 10/2017 | Zielke | ................ | E04C 2/326 |
| 9,815,546 | B2 | * | 11/2017 | Mizuno | ................ | B64C 1/12 |
| 9,845,600 | B2 | * | 12/2017 | Sypeck | ................ | B21D 47/00 |
| 9,874,306 | B2 | * | 1/2018 | Burkhard | ................ | B26D 3/065 |
| 9,975,309 | B2 | * | 5/2018 | Patel | ................ | B32B 3/12 |
| 9,981,443 | B2 | * | 5/2018 | Sumi | ................ | B29C 49/0047 |
| 10,016,955 | B2 | * | 7/2018 | Mills | ................ | B32B 27/08 |
| 2002/0139899 | A1 | * | 10/2002 | Porte | ................ | B64D 33/02 |
| | | | | | | 244/134 B |
| 2007/0256379 | A1 | * | 11/2007 | Edwards | ................ | B32B 21/047 |
| | | | | | | 52/309.9 |

(56) References Cited

U.S. PATENT DOCUMENTS

2015/0211230 A1\* 7/2015 Jimenez Horwitz ... E02D 29/02
52/426

FOREIGN PATENT DOCUMENTS

| CN | 101251227 A | 8/2008 |
|----|-------------|--------|
| CN | 201567737 U | 9/2010 |
| CN | 202359876 U | 8/2012 |
| CN | 103192551 A | 7/2013 |
| JP | 2004108070 A | 4/2004 |

OTHER PUBLICATIONS

International Search Report and Written Opinion regarding International Application No. PCT/CN2017/103301, dated Dec. 11, 2017, 14 pages.

\* cited by examiner

HOLLOW PIPE-SANDWICHING METAL PLATE AND APPLICATIONS THEREOF

CROSS-REFERENCE TO RELATED APPLICATIONS AND CLAIM OF PRIORITY

The present application claims priority under 35 U.S.C. § 365 to International Patent Application No. PCT/CN2017/103301 filed Sep. 26, 2017, entitled "HOLLOW PIPE-SANDWICHING METAL PLATE AND APPLICATIONS THEREOF", and through Chinese Patent Application No. 2016109674460, which was filed on Oct. 31, 2016, Chinese Patent Application No. 2017106215941, which was filed on Jul. 27, 2017, Chinese Patent Application No. 2017106215956, which was filed on Jul. 27, 2017, Chinese Patent Application No. 2017104653528, which was filed on Jun. 19, 2017, Chinese Patent Application No. 2017100693117, which was filed on Feb. 8, 2017, and Chinese Patent Application No. 2017107009640, which was filed on Aug. 16, 2017, each of which are incorporated herein by reference into the present disclosure as if fully set forth herein.

TECHNICAL FIELD

The present disclosure relates to the technical field of composite materials, and in particular, to a hollow pipe-sandwiching metal plate and applications thereof.

BACKGROUND

Most sandwich composite plates adopt honeycomb plates. However, these honeycomb plates have the following defects: (1). As low-and-medium-temperature welding is adopted usually, for example, a welding temperature is 200° C. to 300° C. Once a honeycomb plate is affected by a high temperature, for example, a fire occurs, it will lead to a great decrease in the strength of the honeycomb plate, the honeycomb plate may even fall apart, and therefore such honeycomb plates cannot be used in bearing structures. Because the honeycomb plates are extremely sensitive to environmental changes, the durability of bearing structures will be greatly decreased, and moreover, the life is short, and safety is poor. (2). As honeycomb cores are normally arranged tightly together, during heating, gas flow cannot flow uniformly in the honeycomb cores. As a result, welding is nonuniform, false welding or lack of welding at multiple positions of the honeycomb cores or forming of crevices or holes may be caused easily, and therefore overall welding strength and structural stability are decreased. (3). The honeycomb cores generally can be welded only by means of radiation heating. Heating by using this heating method is slow, easily leading to nonuniform heating of a workpiece. Consequently, thermal deformation is engendered, a defective rate is increased greatly, service life is shortened, and production costs are increased. Furthermore, after heating is complete, the workpiece needs to be transported into a cooling chamber for cooling, and therefore heating and cooling cannot be completed in one step. As a result, working time is prolonged greatly, and the efficiency is lowered. (4). The welding between the honeycomb cores and panels is not firm, linear-contact or point-contact welding is adopted most, and overall stability is poor.

In addition, because of defects in welding processes and structures, all the existing sandwich composite plates cannot be used in bearing structures, cannot be brazed conveniently with hot gas, and do not have properties such as high strength and high temperature resistance.

SUMMARY

The objective of the present disclosure is to provide a hollow pipe-sandwiching metal plate with light weight, high strength, low stress, pressure-bearing ability, heat-insulating ability and high temperature resistance and applications thereof to overcome the above-mentioned defects of the prior art.

The hollow pipe-sandwiching metal plate of the present disclosure comprises a first panel, a second panel, and multiple hollow pipes between the first panel and the second panel; a gap is arranged between at least two hollow pipes, and the hollow pipes are connected to the first panel and the second panel by brazing.

Further, through gas passages are arranged among the hollow pipes. High-temperature gas is utilized to flow through the gas passages for heating to braze the hollow pipes to the first panel and the second panel.

By arranging the through gas passages, the structure of the metal plate can be integrated with a brazing process, which, in comparison with methods, such as radiation heating applied on the outer surface of the metal plate, has the following advantages: on one hand, the high-temperature gas runs through the inner cavity of the metal plate and is in contact with the hollow pipes, so that temperatures at all positions of the metal plate are close, consequently, temperature uniformity is increased greatly, and deformation cannot be caused due to thermal difference; on the other hand, heating time can be shortened, and the efficiency and quality of brazing can be increased.

The through gas passages can be one or any combination of three types of structures including horizontal gas passages, longitudinal gas passages and oblique gas passages.

The temperature of the above-mentioned high-temperature gas can be higher than the temperature of the brazing filler metal used in brazing but lower than the temperature of base metal, so that the brazing filler metal can be melted while the base metal is not damaged. The high-temperature gas can be shielding gas, such as nitrogen, helium or hydrogen.

Cold gas can be utilized to flow through the gas passages to decrease temperature to cool the hollow pipes, the first panel and the second panel for shaping.

Further, at least one end of each hollow pipe is provided with a flange; the multiple hollow pipes all are hollow pipes with flanges; or the multiple hollow pipes include hollow pipes with flanges and hollow pipes without flanges. The flanges can enlarge the welding areas between the hollow pipes and the panels, increasing the brazing strength of the hollow pipes.

Each flange of this disclosure can be a contact surface bent outwardly along the end of the hollow pipe or a contact surface bent inwardly along the end of the hollow pipe; the flange can also be separately arranged contact surfaces extending outwardly along the end of the hollow pipe, such as at least two symmetrical semicircles or at least two symmetrical strips, or another specially shaped structure, such as a petal shape; and the flange can also be a contact surface which is turned out horizontally along the end of the hollow pipe and bent downwardly. Any of the above-mentioned flange structures can enlarge the welding areas between the hollow pipes and the panels.

In addition, among the multiple hollow pipes, at least one end of each of part of the hollow pipes may be provided with the flange, and the other hollow pipes may not be provided with flanges.

Further, each hollow pipe can be of a closed structure, a hollow structure, a semi-closed structure or the like. For example, the closed structure can be a structure, the inner cavity of which is hollow and the ends of which are closed, or can be a closed structure in which the above-mentioned flange is turned inwardly to cover the end of the hollow pipe. The semi-closed structure can be that the inner cavity of the hollow pipe is semi-closed, or can be that the tubular wall of the hollow pipe is semi-closed, for example, the tubular wall is provided with a slot, the opening of which is small, or the hollow pipe is provided with multiple holes.

Further, the section shape of each hollow pipe is a circle or an ellipse or an N-sided polygon, wherein N is greater than or equal to 3. The N-sided polygon can be a triangle, a square, a pentagon, etc.

Preferably, each hollow pipe is a circular hollow pipe, which has advantages, such as uniform stress, uneasy deformation and high stability, moreover, the production process is simple, and the cost is low. In addition, when each hollow pipe is of the N-sided polygon, preferably, N is greater than 5, and the higher the value of N is, the more each hollow pipe approximates to the circular hollow pipe.

Further, the first panel and the second panel are flat panels or curved panels, or one panel is a flat panel and the other panel is a curved panel.

The curved panel can be applied to hulls, frameworks and so on with any curved structures, and the line form of the curved panel can be curved, wavy, etc.; and the shape of the flat panel can be set according to requirements. The first panel and the second panel can be arranged in parallel, or can be arranged non-parallelly.

When the panels are curved panels, the axes of the hollow pipes are perpendicular to tangent lines to the curved surfaces of the curved panels, in this way, the strength of connection between the hollow pipes and the panels can be enhanced, and lack of welding at multiple positions of the hollow pipes or production of crevices or holes is prevented.

Further, the material of the first panel and/or the second panel is a stainless steel, carbon steel, titanium or copper alloy plate. Preferably, a high-temperature-resistant material is adopted to produce the first panel and the second panel, so that the hollow pipe-sandwiching metal plate can have effects, such as fire proofing.

Further, the material of the hollow pipes is a stainless steel, carbon steel, titanium or copper alloy plate.

Further, the hollow pipes are connected to the first panel and the second panel through brazing filler metal by brazing, and copper, aluminum, tin or alloy brazing filler metal is adopted as the brazing filler metal. Preferably, the brazing filler metal is a material with a high melting point and can resist high temperature.

Further, the hollow pipes are connected to the first panel and the second panel through brazing filler metal by brazing, and the brazing filler metal is laid directly or arranged in the form of loops between the hollow pipes and the first panel and between the hollow pipes and the second panel. "In the form of loops" means that the brazing filler metal rings or encircles the hollow pipes.

Further, the hollow pipes are provided with gas holes. On one hand, via the gas holes, the hollow pipes can be vacuumized and filled with shielding gas and/or reducing gas to ensure that the inner cavities of the hollow pipes are under an oxygen-free environment and a reducing environment, ensuring that the hollow pipes cannot be oxidized, and thereby the strength and quality of the whole structure are ensured; and on the other hand, via the gas holes, a thermal insulation material, such as raw foaming solution, can be injected.

The gas hole can be arranged at any position of the hollow pipe. The gas hole is arranged at the upper part of the hollow pipe, and the gas hole is arranged at a position 5 mm to 20 mm away from the top of the hollow pipe, which can help to discharge gas with density lower than that of the air, such as oxygen. There is at least one gas hole.

Further, the thermal insulation material is arranged in the inner cavities of the hollow pipes and/or between the adjacent hollow pipes. Thus, the hollow pipe-sandwiching metal plate can have the effects of thermal insulation, sound insulation and vibration isolation.

The thermal insulation material can be one or any combination of sintered particles, sawdust, inorganic cotton, foaming material and so on. The thermal insulation material, such as foaming material, is injected into the hollow pipes via the gas holes, and the foaming material can be raw polyurethane solution or raw phenolic resin solution; in addition, the foaming material injected into the hollow pipes not only plays the role of thermal insulation, but also can reduce convection in the pipe bodies, enhancing the effect of sound insulation; furthermore, the filling foamed layer can serve as a supporting structure to prevent the hollow pipes from being bent and increase the supporting force of the hollow pipes; moreover, the service life of the foam is long, and because there is no air inside, cracking, various reactions and so on won't occur.

All or part of the arrangement gaps among the hollow pipes are filled with the thermal insulation material.

Further, a border is arranged on at least one of the sides of the circumference of the first panel and/or the second panel.

Further, the multiple hollow pipes are limited by limiting metal, and the multiple hollow pipes in any row are connected into a whole through the limiting metal; the limiting metal is brazing filler metal, the brazing filler metal is provided with holes corresponding to the positions of the hollow pipes, and the edges of the holes are provided with limiting structures for limiting the hollow pipes; or the limiting metal is shaped like a sheet, a strip or a wire.

By means of the limiting metal, in the process of assembling and brazing the metal plate or after brazing and at the initial stage of cooling, the phenomenon that the hollow pipes shift, topple down or are blown to be inclined cannot be caused due to factors such as gas flow and heat circulation, and thereby working efficiency and brazing quality are increased greatly.

The above-mentioned limiting metal means a metal material capable of limiting the hollow pipes, such as brazing filler metal, metal wires and metal sheets, wherein the metal wires each can be of a strip structure, and are connected to the hollow pipes by way of welding or winding; and the metal wires can also be of annular structures, and encircle and are welded to the hollow pipes.

In the above-mentioned solution, there is at least one piece of brazing filler metal; when there is more than one piece of brazing filler metal, the multiple hollow pipes are divided into multiple groups, and each group corresponds to one piece of brazing filler metal.

Each metal sheet is provided with multiple projections, and each projection is connected to one hollow pipe corresponding to its position.

"The multiple hollow pipes in any row are connected into a whole through the limiting metal" can be "the hollow pipes in any row are connected into a whole through the limiting metal" or "the hollow pipes in any row are divided into groups, and each group of hollow pipes are connected into a whole through the limiting metal" or "the hollow pipes in part of the rows are connected into a whole through the limiting metal, the hollow pipes in the other rows are divided into groups, and each group of hollow pipes are connected into a whole through the limiting metal". In addition, "the multiple hollow pipes in any row are connected into a whole through the limiting metal" can be "the hollow pipes in each row are connected into a whole through the limiting metal" or "the hollow pipes in two, three . . . or N adjacent rows are connected into a whole through the limiting metal".

The metal wires can limit any combination of the hollow pipes in the horizontal and longitudinal rows, the horizontal and oblique rows, the longitudinal and oblique rows, the horizontal rows, the longitudinal rows or the oblique rows.

The material of the above-mentioned limiting metal can be the same as or different from a base material.

Further, the limiting structures are flanges which downwardly extend out from the brazing filler metal along the edges of the holes, and the holes limit the hollow pipes by means of the flanges; or each limiting portion consists of limiting projections extending outwardly from the brazing filler metal along the edge of one hole and a flange downwardly extending out along the edge of the hole, and the holes limit the hollow pipes by means of the flanges, and stick the hollow pipes by means of the limiting projections. Thus, the hollow pipes can be prevented from shifting, and the accuracy of the positions of the hollow pipes is increased greatly. The shape of the limiting projection can be of any structure, such as a curved, polygonal or irregularly-shaped structure, as long as the hollow pipes can be stuck.

Further, the brazing filler metal is hollowed out at non-hollow-pipe positions, and thus, the piling of excessive brazing filler metal can be prevented in the process of heating.

Further, the multiple hollow pipes can be arranged optionally into different shapes, such as a square, a polygon or another shape.

Another hollow pipe-sandwiching metal plate of the present disclosure comprises a first panel, a second panel, and multiple hollow pipes between the first panel and the second panel; a gap is arranged between at least two hollow pipes, the hollow pipes are connected to the first panel and the second panel by brazing, and the edges of the panels are flanged or not flanged.

For example, when the panels are flanged, another plate which is perpendicular to the panel extends out from the edge of each panel, the plate can substitute for the above-mentioned border, and hollow pipes can also be added on the plate, so that a metal plate with a corner is formed.

Applications of a hollow pipe-sandwiching metal plate are characterized in that the hollow pipe-sandwiching metal plate comprises a first panel, a second panel, and a plurality of hollow pipes between the first panel and the second panel, and is used as a material for a building structure, a vehicle, a ship, an aircraft, aerospace equipment, a container, a bridge, a road, a tunnel, a railway foundation, furniture, a culvert, a vacuum pipeline or a case; a gap is arranged between at least two hollow pipes, and the hollow pipes are connected to the first panel and the second panel by brazing.

The building structure can be but is not limited to girders, columns, floor plates, walls, balconies and awnings.

The vehicle can be sedans, coaches, trucks, cementing trucks, etc., or can be metros, light rails, magnetic levitation, municipal railways, streetcars, etc., the ships can be steamships, aircraft carriers, etc., the aircraft can be airliners, helicopters, gliders, etc., the metal plate can be used as hulls, frameworks and accessory materials of the above-mentioned means, and the accessory materials can be engine hoods, reinforcing rib plates, bulkheads, etc.

The aerospace equipment can be a spacecraft, such as a satellite, a spaceship or a probe.

A container body of the container is made of the metal plates. The container body can comprise a bottom plate, a top plate, side plates, doors, etc.

A bridge body of the bridge is made of the metal plates. The bridge can be an overpass, a pedestrian overpass, a boarding bridge for planes, etc. The bridge body can comprise a bridge deck, steps, guardrails, supporting bodies, etc.

The road is made of the metal plates. The road can be a street, a runway, an indoor floor, etc.

The body, the lining and so on of the tunnel can be made of the metal plates.

The railway foundation is normally a ballastless track, and the metal plates can substitute for a shockproof layer and an anti-seepage layer between precast concrete members, the railway foundation and precast concrete members.

A furniture body of the furniture is made of the metal plates. The furniture can be a table, a chair, a cabinet, a bed, etc.

A culvert body of the culvert is made of the metal plates.

A pipe body of the vacuum pipeline is made of the metal plates. For example, the vacuum pipe is a vacuum transportation pipeline.

A case body of the case is made of the metal plates. The case can be a tool kit, a suitcase, a storage box, etc.

The metal plate of the present disclosure can be used in any engineering field, and has advantages, such as light weight, high strength, rust resistance, aging resistance, eternal life, thermal insulation, vibration isolation and good stability, moreover, the metal plate is easy and convenient to connect or assemble, and time and labor can be saved.

DETAILED DESCRIPTION

The present disclosure will be further described in detail below in reference to the drawings of the specification.

Figure 1:
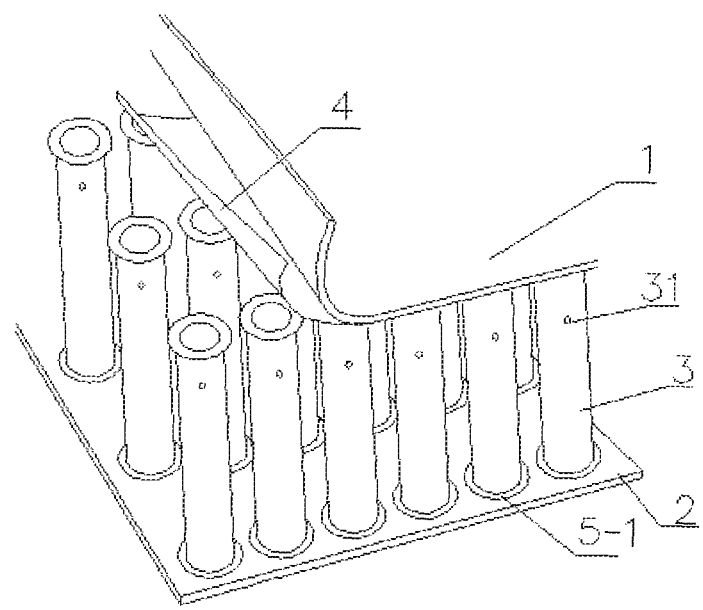
FIG. 1 illustrates a structural schematic diagram of a hollow pipe-sandwiching metal plate according to an embodiment of the present disclosure.

As shown in FIG. 1, a hollow pipe-sandwiching metal plate comprises a first panel 1, a second panel 2, and multiple hollow pipes 3 between the first panel 1 and the second panel 2; gaps are arranged among the multiple hollow pipes 3, and the hollow pipes 3 are connected to the first panel 1 and the second panel 2 by brazing.

In the present embodiment, the section shape of each hollow pipe 3 is a circle, and each hollow pipe 3 is of a hollow structure. A certain distance is arranged between each two adjacent hollow pipes 3.

The upper and lower ends of each hollow pipe 3 are provided with flanges 5-1, which are turned outward to form circles. The flanges 5-1 of the hollow pipes 3 are connected to the first panel 1 and the second panel 2 through brazing filler metal 4 by brazing, and the brazing filler metal 4 is laid directly between the hollow pipes 3 and the two panels.

In the present embodiment, the brazing filler metal 4 is copper brazing filler metal. Both the first panel 1 and the second panel 2 are flat panels. The first panel 1, the second panel 2 and the hollow pipes 3 are all made of stainless steel.

Each hollow pipe 3 is provided with a gas hole 31, and the gas hole 31 is arranged at a position 10 mm away from the top of the hollow pipe. In the process of brazing, shielding gas can be injected into the hollow pipes 3, and when the content of oxygen is very low, reducing gas can be injected to reduce oxide layers of the stainless steel hollow pipes. The gas can be discharged via the gas holes 31.

Preferably, the hollow pipes can be filled with a foaming material (such as raw polyurethane solution) via the gas holes, and the foaming material can be foamed into polyurethane foam in the hollow pipes; and besides, foaming inorganic particles can also be arranged in the hollow pipes in advance.

The arrangement gaps among the hollow pipes can also be filled with inorganic cotton, such as mineral wool. The mineral wool is block-like, and its size can match the gaps among the hollow pipes, so that each piece of mineral wool can be just tightly put into the gaps among the hollow pipes.

Figure 2:
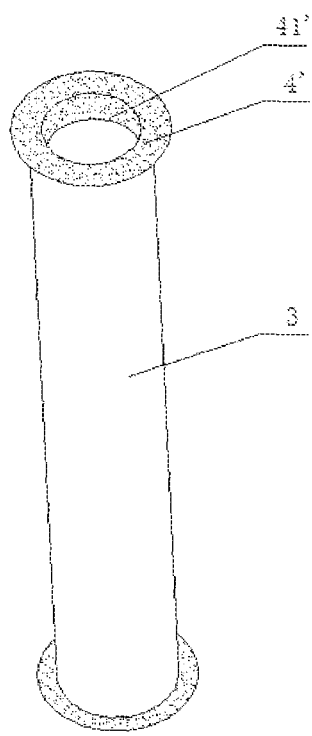
FIG. 2 illustrates a structural schematic diagram of a hollow pipe according to an embodiment of the present disclosure.

As shown in FIG. 2, brazing filler metal 4' is punched and flanged, so that the hollow pipes 3 are nested in flanges 41' of the brazing filler metal 4' and limited.

Figure 3:
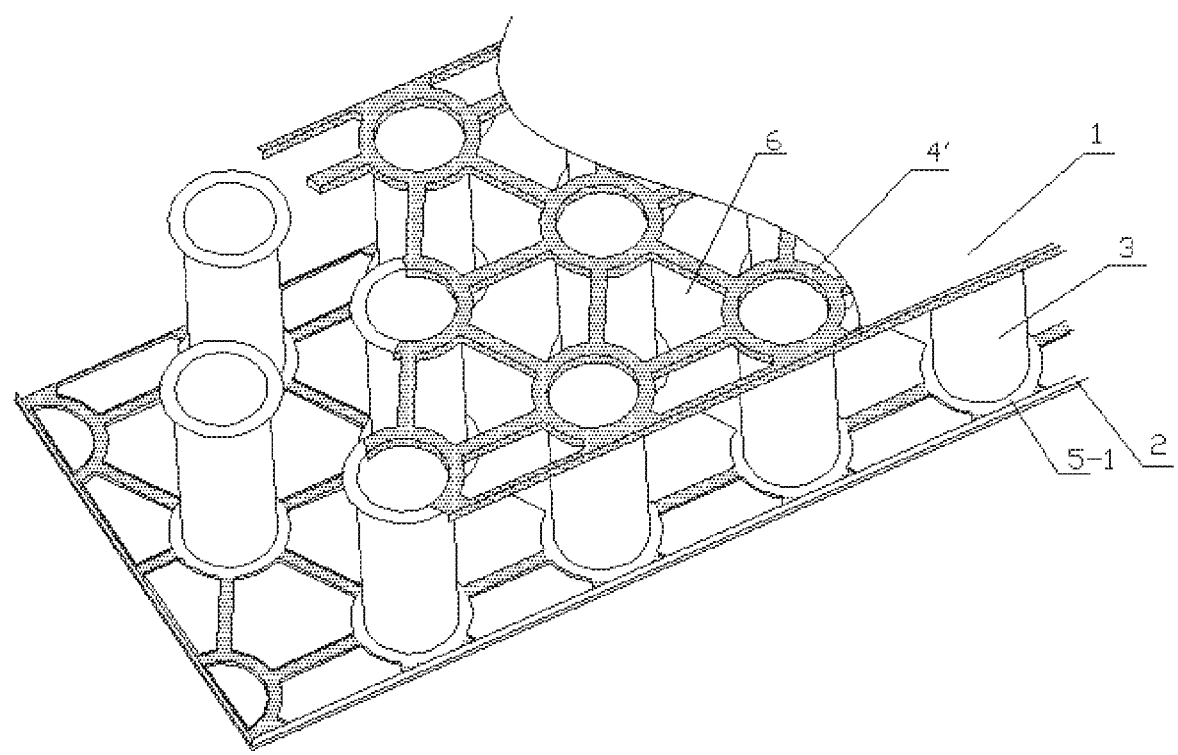
FIG. 3 illustrates a structural schematic diagram of a hollow pipe-sandwiching metal plate according to an embodiment of the present disclosure.

As shown in FIG. 3, the brazing filler metal 4' is provided with hollows 6 at non-hollow-pipe positions.

Figure 4:
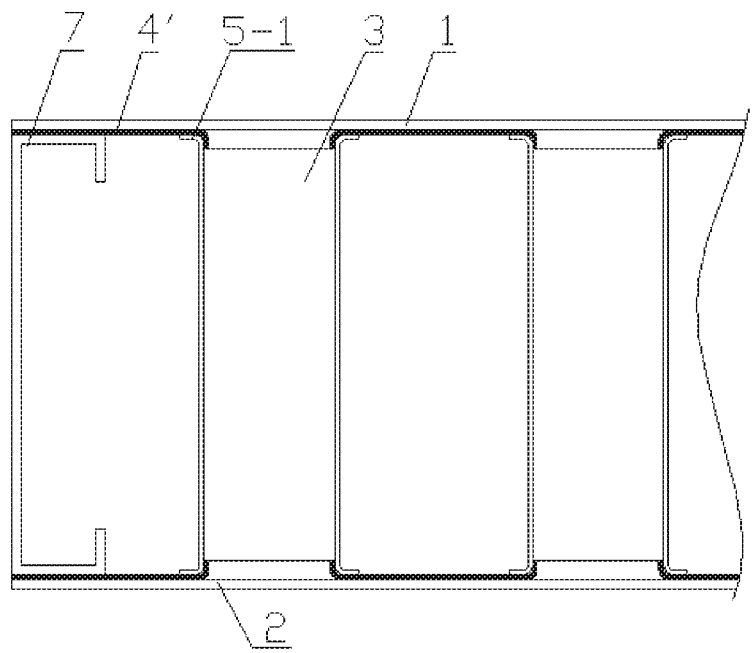
FIG. 4 illustrates a structural schematic diagram of a hollow pipe-sandwiching metal plate according to an embodiment of the present disclosure.

As shown in FIG. 4, the front edges and the rear edges of the multiple hollow pipes 3 are provided with borders 7, the borders 7 adopt stainless steel, and the borders 7, the first panel 1 and the second panel 2 are connected into a whole by brazing.

Figure 5:
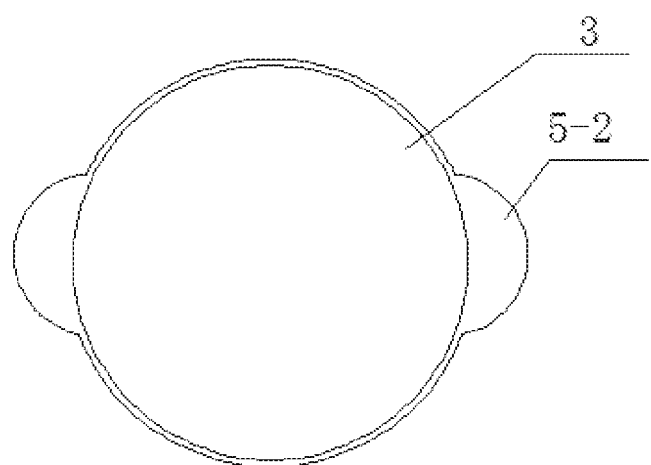
FIG. 5 illustrates a structural schematic diagram of a hollow pipe according to an embodiment of the present disclosure.

As shown in FIG. 5, both the upper and lower ends of each hollow pipe 3 are provided with flanges 5-2, each flange 5-2 consists of two semicircular structures which are arranged symmetrically on the hollow pipe, and the flanges 5-2 of the hollow pipes are connected to the first panel and the second panel by brazing.

Figure 6:
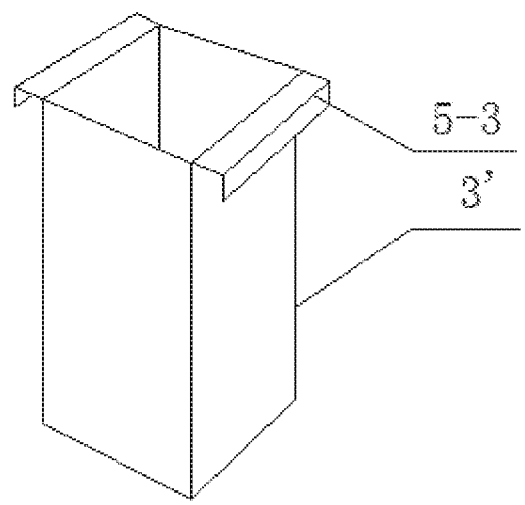
FIG. 6 illustrates a structural schematic diagram of a hollow pipe according to an embodiment of the present disclosure.

As shown in FIG. 6, the section shape of each hollow pipe 3' is a square, both the upper and lower ends of the hollow pipe 3' are provided with flanges 5-3, each flange 5-3 consists of two bent structures which are arranged symmetrically on the hollow pipe, and the flanges 5-3 of the hollow pipes are connected to the first panel and the second panel by brazing.

Figure 7:
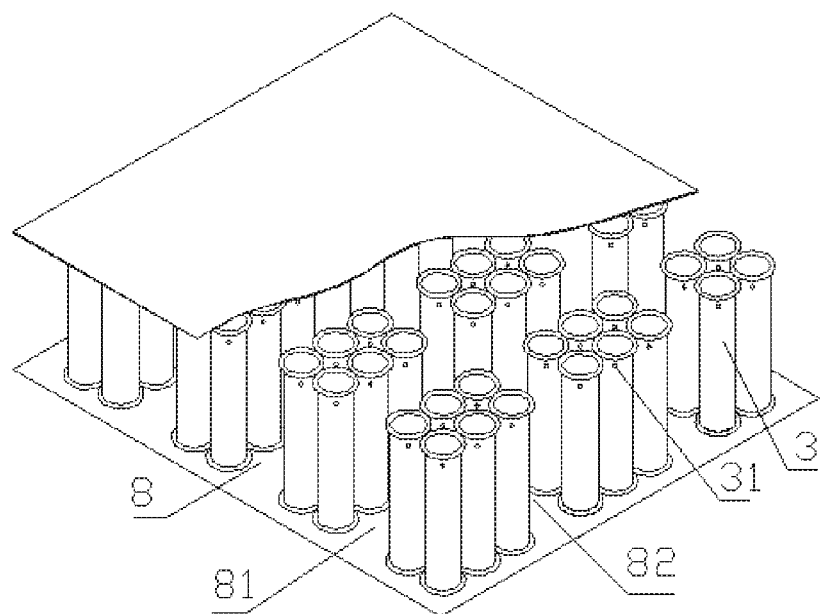
FIG. 7 illustrates a structural schematic diagram of a hollow pipe-sandwiching metal plate according to an embodiment of the present disclosure.

As shown in FIG. 7, through gas passages 8 are arranged among the multiple hollow pipes 3, and high-temperature gas is utilized to flow forward, backward, leftward and rightward through the gas passages 8 for heating to braze the hollow pipes 3 to the first panel 1 and the second panel 2.

Specifically, the hollow pipes 3 are circular pipes, and the number of the hollow pipes can be chosen according to requirements. The adjacent hollow pipes 3 are arranged at intervals, forming horizontal gas passages 81 and longitudinal gas passages 82. The high-temperature gas gets into the inner cavity of the metal plate via the horizontal gas passages 81 and the longitudinal gas passages 82. The hollow pipes 3 are brazed to the first panel and the second panel through brazing filler metal by means of the high-temperature gas, and the brazing filler metal is laid between the hollow pipes and the first panel and between the hollow pipes and the second panel. The brazing filler metal is copper brazing filler metal, the temperature of the high-temperature gas is higher than the melting point of copper, and is lower than the melting point of the material of the first panel, the second panel and the hollow pipes, in this way, the copper brazing filler metal can be melted by the high-temperature gas, and the liquid copper brazing filler metal is utilize to wet the base material, fill the gaps of connection and diffuse with the base material, so that fixed connection is achieved. After brazing is complete, cold gas is utilized to flow forward, backward, leftward and rightward through the horizontal gas passages 81 and the longitudinal gas passages 82 to cool the hollow pipes 3, the first panel and the second panel for shaping. Both the high-temperature gas and the cold gas are nitrogen.

A connecting plate can be inserted between each two adjacent rows of hollow pipes, the connecting plate is provided with branches, the positions of the branches correspond to the positions of the gas holes 31, the branches are inserted in the holes, and the two adjacent rows of hollow pipes are exhausted from one end of the connecting plate, so that the hollow pipes are under an oxygen-free environment.

Figure 8:
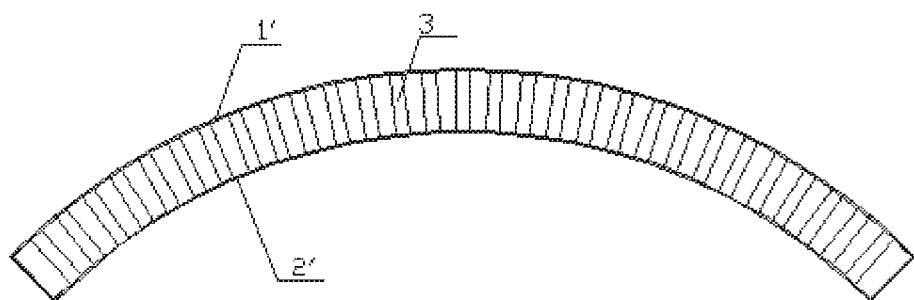
FIG. 8 illustrates a structural schematic diagram of a panel according to an embodiment of the present disclosure.

As shown in FIG. 8, both the first panel 1' and the second panel 2' are curved panels. Both ends of the hollow pipes 3 are connected perpendicularly to the contact surfaces of the panels. The line form of the curved panel is curved, the multiple hollow pipes 3 are arranged at intervals, the axis of each hollow pipe 3 is perpendicular to a tangent line of a corresponding curve, thus, the strength of connection between the hollow pipes 3 and the panels can be enhanced, brazing nonuniformity caused by lack of welding at multiple positions of the hollow pipes or production of crevices or holes is prevented, and thereby the solution can greatly increase overall strength and quality.

The first panel 1' and the second panel 2' have the same shape. The central angle of the curved panel can be designed to be large, or can be designed to be small.

The other structures are the same as those of FIG. 1 or 2.

Figure 9:
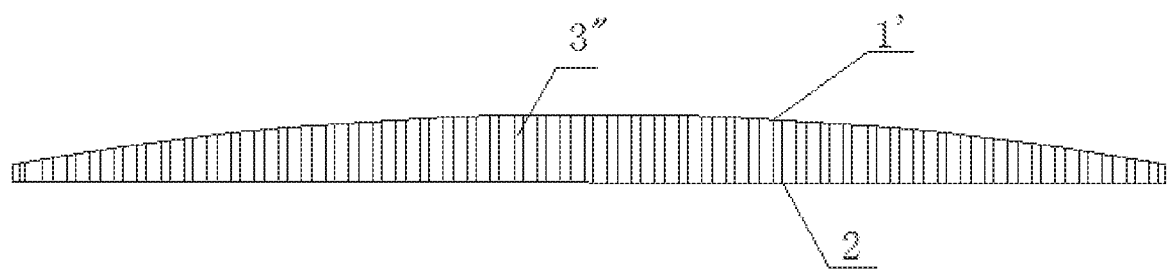
FIG. 9 illustrates a structural schematic diagram of a panel according to an embodiment of the present disclosure.

As shown in FIG. 9, the first panel 1' is a curved panel, the second panel 2 is a flat panel, the ends of the hollow pipes 3" which are connected to the curved panel are parallel or approximately parallel to the contact surface of the curved plate, both the upper and lower ends of the hollow pipes 3" are provided with flanges, the flanges are parallel or approximately parallel to the contact surface of the curved plate, consequently, the hollow pipes 3" and the curved panel can be welded firmly, lack of welding at multiple positions of the hollow pipes or production of crevices or holes is prevented, and thereby overall strength and quality are increased greatly.

The other structures are the same as those of FIG. 1 or 2, and of FIG. 8.

Figure 10:
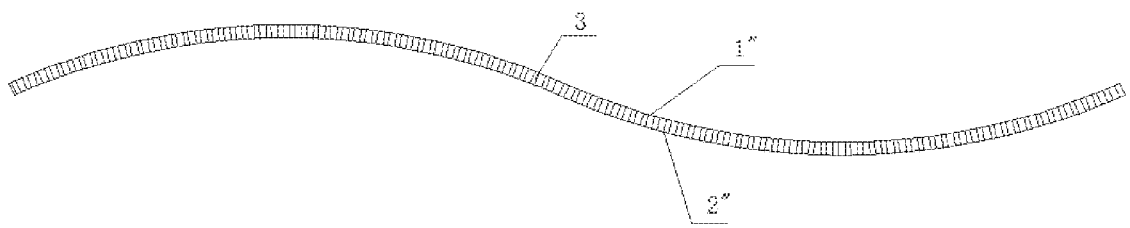
FIG. 10 illustrates a structural schematic diagram of a panel according to an embodiment of the present disclosure.

As shown in FIG. 10, both the first panel 1' and the second panel 2' are curved panels, and the line form of the curved panels is wavy.

The other structures are the same as those of FIG. 1 or 2, and of FIG. 8.

In some embodiments, both the first panel and the second panel are flat panels, and moreover, the first panel is not parallel to the second panel, that is, the first panel is arranged obliquely, and the second panel is arranged horizontally. The end of each hollow pipe, which is connected to the first panel, is a slope, both the upper and lower ends of the hollow pipes are provided with flanges, the flanges are parallel or approximately parallel to the contact surface of the first panel, consequently, the hollow pipes and the curved panel can be welded firmly, lack of welding at multiple positions of the hollow pipes or production of crevices or holes is prevented, and thereby overall strength and quality are increased greatly.

The other structures are the same as those of FIG. 1 or 2 and of FIG. 8.

Figure 11:
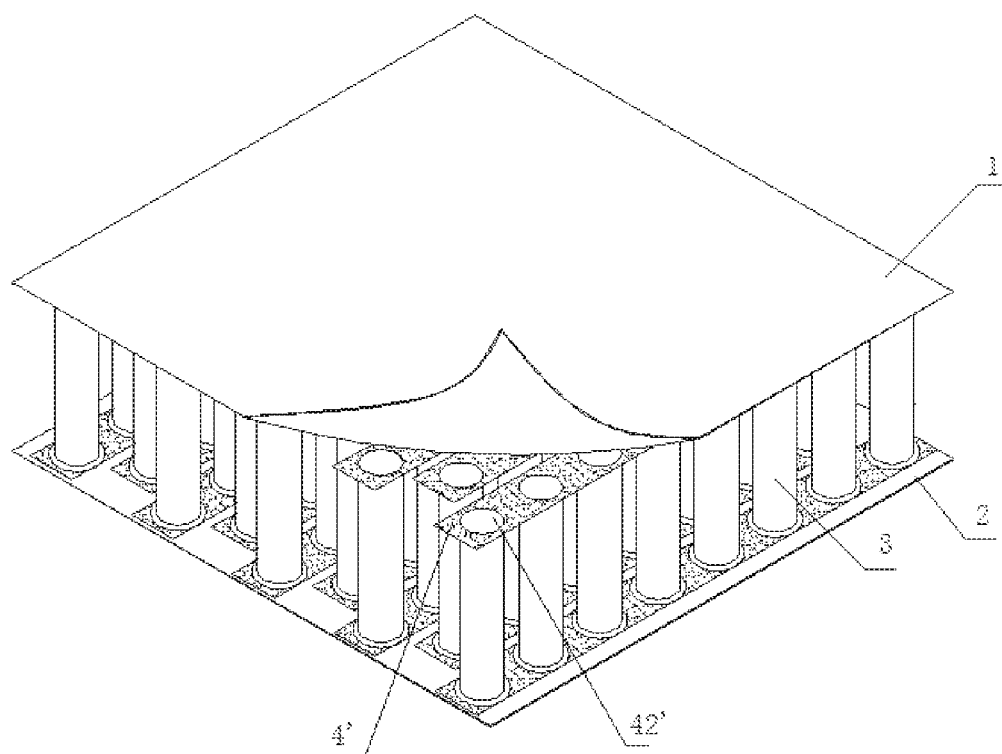
FIG. 11 illustrates a structural schematic diagram of a hollow pipe-sandwiching metal plate according to an embodiment of the present disclosure.

As shown in FIG. 11, brazing filler metal 4' in the present embodiment is a sheet, and brazing filler metal 4' is punched and flanged.

In the present embodiment, the multiple hollow pipes 3 are arranged into multiple rows, each longitudinal row corresponds to one piece of brazing filler metal 4', and holes 42' in each brazing filler metal 4' correspond to the number of each row of hollow pipes 3. For example, the multiple hollow pipes 3 are arranged into nine rows, the upper end and the lower end of each longitudinal row respectively correspond to one piece of brazing filler metal 4', and there are 18 pieces of brazing filler metal in total.

Figure 12:
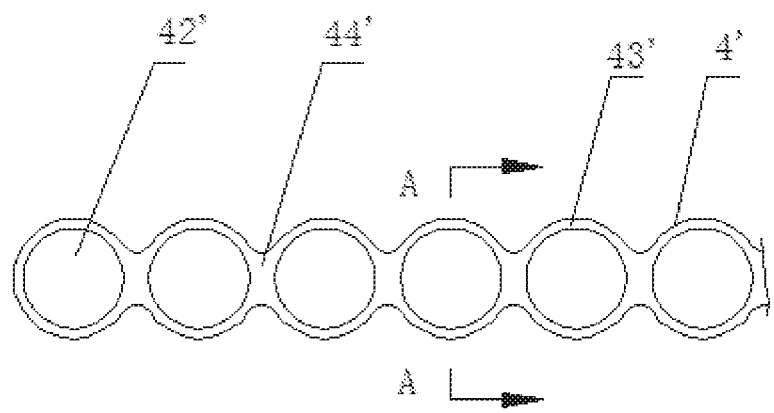
FIG. 12 illustrates a structural schematic diagram of hollow pipes according to an embodiment of the present disclosure.
Figure 13:
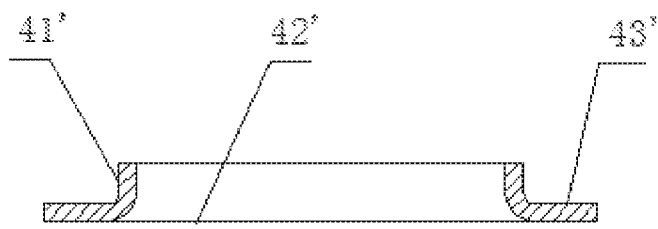
FIG. 13 illustrates an A-A sectional view of hollow pipes of FIG. 12.

As shown in FIG. 12 and FIG. 13, the brazing filler metal 4' is shaped like a strip, and multiple holes 42' with walls 43' are connected directly into a whole through connecting ribs 44' to form the brazing filler metal 4'.

Figure 14:
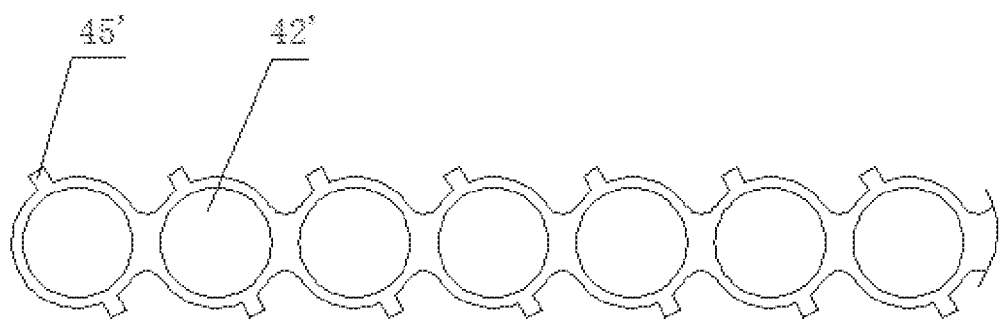
FIG. 14 illustrates a structural schematic diagram of hollow pipes according to an embodiment of the present disclosure.

As shown in FIG. 14, limiting projections 45' extend outwardly from the brazing filler metal 4' along the edge of each hole 42', and each hole 42' hoops one hollow pipe 3 by means of the flange 41', and sticks the hollow pipe by means of the limiting projections 45'.

There are two limiting projections 45' in the present embodiment, and the limiting projections 45' are arranged symmetrically, and are shaped like strips.

The other structures are the same as those of FIGS. 12 and 13.

Figure 15:
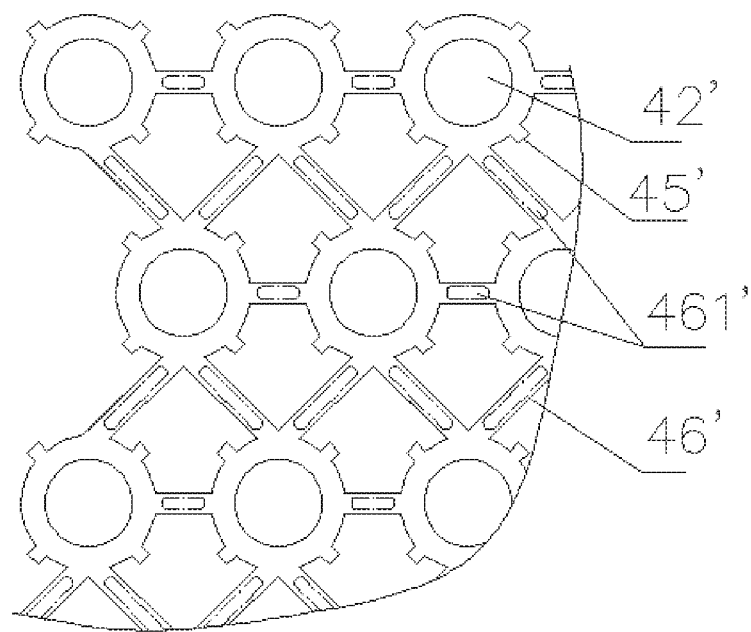
FIG. 15 illustrates a structural schematic diagram of hollow pipes according to an embodiment of the present disclosure.

As shown in FIG. 15, there are four limiting projections 45', which are arranged symmetrically. The brazing filler metal 4' is one-piece, and the brazing filler metal 4' is hollowed out or punched at non-hollow-pipe positions, that is, the holes 42' are connected through brazing filler metal connecting ribs 46'.

Each brazing filler metal connecting rib 46' is provided with a slot 461', so that the brazing filler metal is saved greatly.

The other structures are the same as those of FIG. 14.

Figure 16:
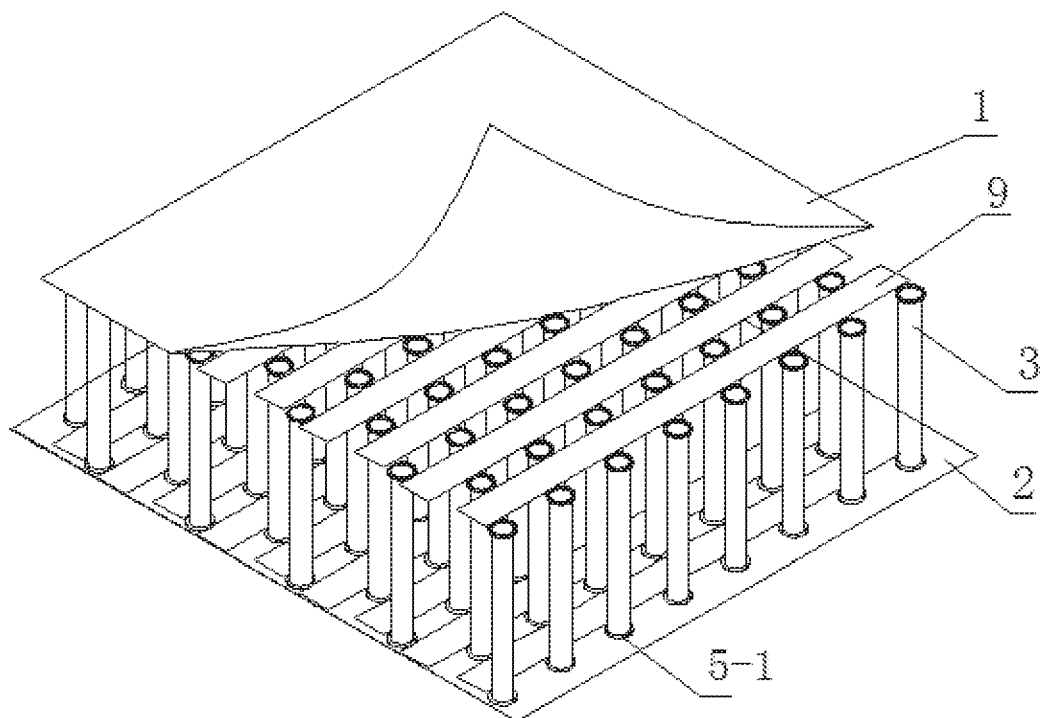
FIG. 16 illustrates a structural schematic diagram of a hollow pipe-sandwiching metal plate according to an embodiment of the present disclosure.

As shown in FIG. 16, the hollow pipes are limited by metal sheets 9 rather than the brazing filler metal. The brazing filler metal can be laid between the hollow pipes and the panels.

For example, the upper ends and the lower ends of the hollow pipes 3 in each two adjacent horizontal rows respectively share one metal sheet 9, furthermore, both the upper ends and the lower ends of the hollow pipes 3 are provided with flanges 5-1, the metal sheet 9 is connected to the flange of the upper end/lower end of each hollow pipe in the horizontal rows by welding, and preferably, the metal sheet 9 is connected to the bottom surfaces of the flanges 5-1 of the hollow pipes by welding, for example, adopting an electric resistance welding method. The material of the metal sheets 9 is stainless steel.

The metal sheet as a limiting structure in the present embodiment forms the multiple hollow pipes 3 into a whole, that is, a module with certain specifications is formed. When the first panel 1, the second panel 2, and the hollow pipes 3 are assembled, the multiple hollow pipes can be placed as a whole, consequently, the speed of assembly is increased greatly, and thereby working efficiency is increased.

In addition, such an integral limiting method can ensure that every hollow pipe won't shift and topple down, greatly increasing the accuracy of the positions of the hollow pipes, and thereby brazing quality is increased.

Figure 17:
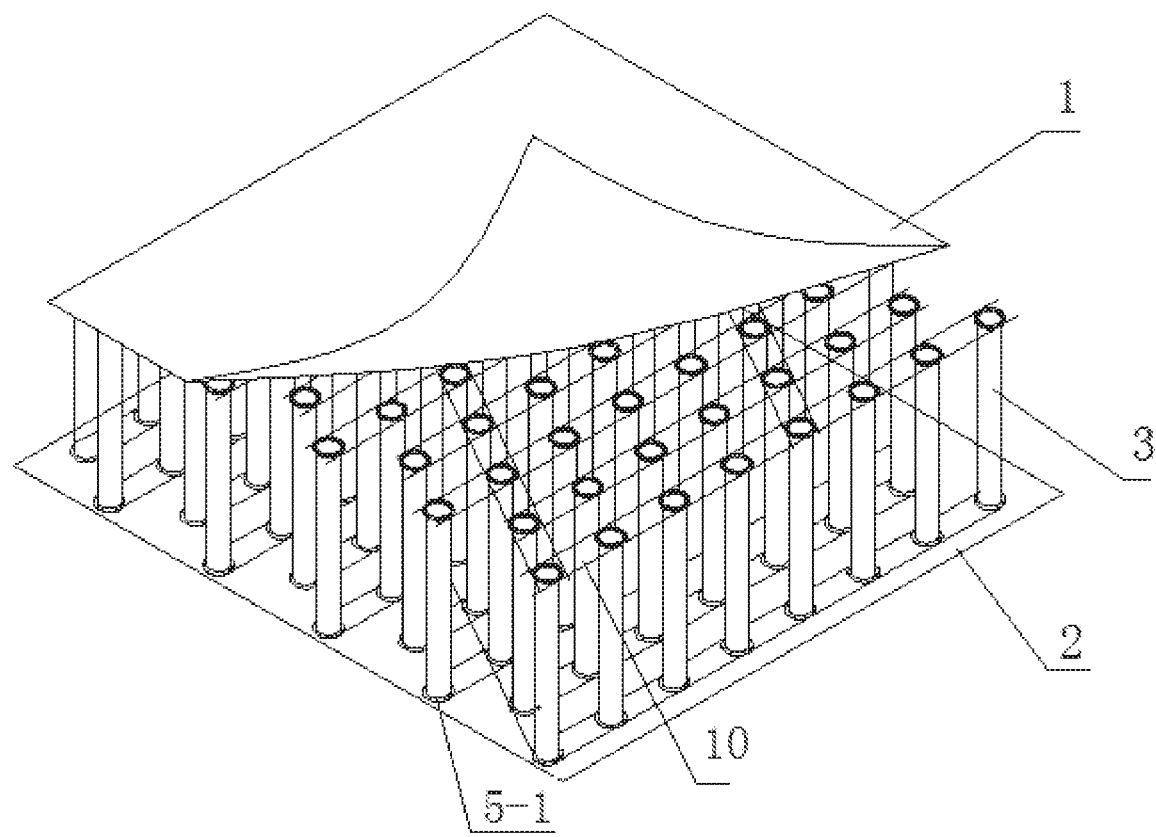
FIG. 17 illustrates a structural schematic diagram of a hollow pipe-sandwiching metal plate according to an embodiment of the present disclosure.

As shown in FIG. 17, the hollow pipes 3 are limited by metal wires 10 rather than the brazing filler metal. The brazing filler metal can be laid between the hollow pipes and the panels.

For example, both sides of the upper ends and the lower ends of the hollow pipes 3 in each row respectively share one metal wire 10, the metal wires 10 are welded to the flanges 5-1 of each hollow pipe, and thereby the metal wires 10 connect this row of hollow pipes 3 into a whole. The hollow pipes in two oblique rows are then chosen, metal wires 10 are respectively welded to the upper and lower ends, and thus, among the hollow pipes in each horizontal row, two hollow pipes are connected by metal wires in the oblique rows. Such a connection method can form all the hollow pipes into a module with certain specifications, that is, all the hollow pipes are connected into a whole. The advantages are as follows: on one hand, in the process of assembling the hollow pipes and the panels, the speed of assembly can be increased greatly, and thereby working efficiency is increased; on the other hand, it can be ensured that every hollow pipe won't shift and topple down, greatly increasing the accuracy of the positions of the hollow pipes, and thereby brazing quality is increased.

The metal wire 10 is of a line-shaped structure, and the material is a stainless steel wire.

In some embodiments, the brazing filler metal at the upper ends and the lower ends of the hollow pipes is arranged in different ways. For example, for the upper ends of the hollow pipes, each longitudinal row corresponds to one piece of brazing filler metal, and the holes in the brazing filler metal correspond to the number of each row of hollow pipes; for the lower ends of the hollow pipes, each two adjacent longitudinal rows correspond to one piece of brazing filler metal, and the holes in each piece of brazing filler metal correspond to the number of the hollow pipes in each two adjacent longitudinal rows.

The other structures are the same as those of FIG. 11.

In some embodiments, the side number of each hollow pipe is greater than that of a pentagon and less than or equal to that of a decagon, for example, the hollow pipe is a hexagonal pipe, a heptagonal pipe, an octagonal pipe or a nonagonal pipe.

Figure 18:
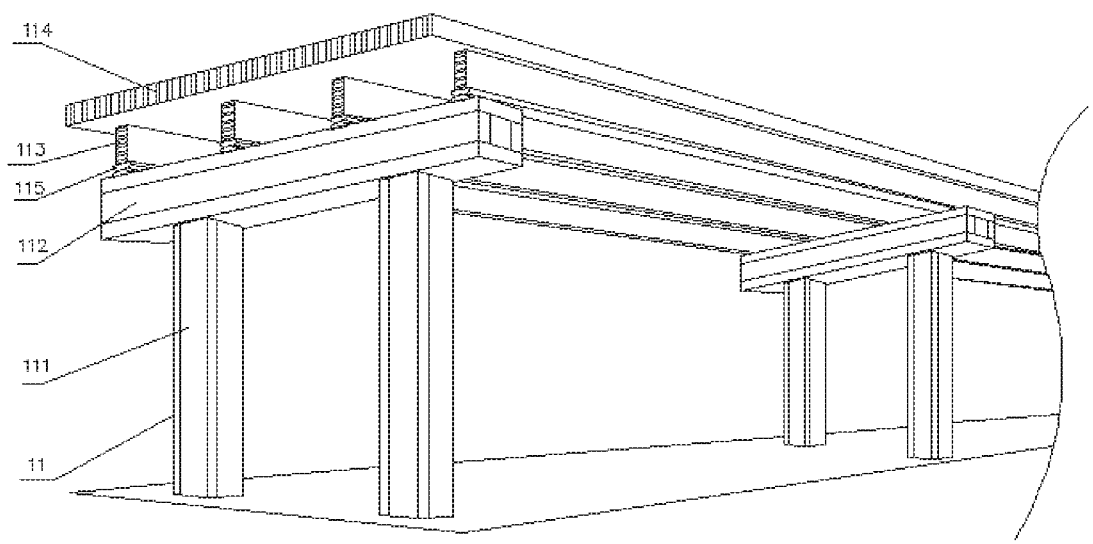
FIG. 18 illustrates a structural schematic diagram of a hollow pipe-sandwiching metal plate according to an embodiment of the present disclosure.

As shown in FIG. 18, a bridge body 11 of a bridge structure comprises piers 111, bent caps 112, supporting beams 113, and a bridge deck 114, the bent caps 112 are arranged on the piers 111, the supporting beams 113 span the multiple bent caps 112 by means of supports 115, and the bridge deck 114 is connected to the supporting beams 113.

At least one structure among the piers 111, the bent caps 112, the supporting beams 113 and the bridge deck 114 is made of any one of the hollow pipe-sandwiching metal plates in embodiments 1-19. Both the supporting beams 113 and the bridge deck 114 can be respectively made of one hollow pipe-sandwiching metal plate, or can be made by assembling multiple hollow pipe-sandwiching metal plates. Both the piers 111 and the bent caps 112 can be respectively formed into a columnar structure by assembling four hollow pipe-sandwiching metal plates.

All the metal plates are connected by welding into the bridge structure, and are reinforced by bolts.

The bridge body which is made of the metal plates has the advantages of high strength, good bearing capability, shock resistance, light self-weight, fireproofness and disassemblability.

Figure 19:
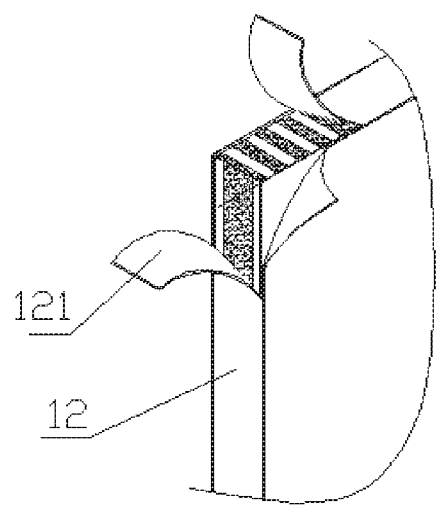
FIG. 19 illustrates a structural schematic diagram of a hollow pipe-sandwiching metal plate according to an embodiment of the present disclosure.

As shown in FIG. 19, a door comprises a door body 12, and the door body 12 is made of any one of the hollow pipe-sandwiching metal plates in embodiments 1-19.

The out layer of the hollow pipe-sandwiching metal plate is wrapped by a surface decorative material 121 such as a veneer or paint.

The door which is made of the metal plate has the advantages of high strength, good thermal insulation, light self-weight and fireproofness.

Figure 20:
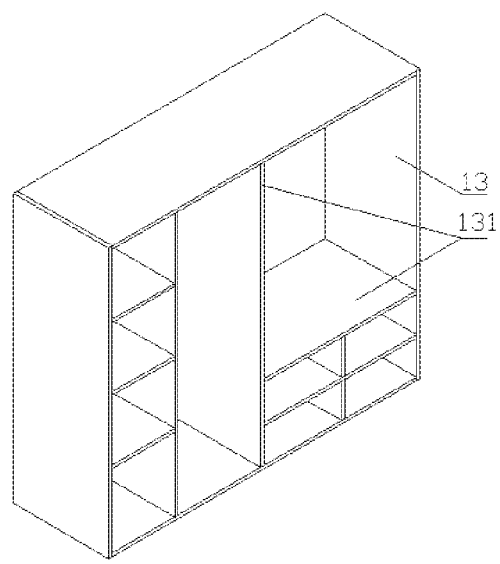
FIG. 20 illustrates a structural schematic diagram of a hollow pipe-sandwiching metal plate according to an embodiment of the present disclosure.

As shown in FIG. 20, a storage cabinet comprises a cabinet body 13, and partitions 131 are arranged in the cabinet body 13, wherein at least one structure among the cabinet body 13 and the partitions 131 is made of any one of the hollow pipe-sandwiching metal plates in embodiments 1-19. The multiple metal plates are connected through multiple bolts into the cabinet body structure. The partitions 131 are divided into horizontal partitions and vertical partitions, and the vertical partitions are connected to the inner wall of the cabinet body through bolts; and the horizontal partitions are also connected to the cabinet body and the vertical partitions through bolts.

The storage cabinet which is made of the metal plates has the advantages of high strength, good thermal insulation, light self-weight and fireproofness.

Figure 21:
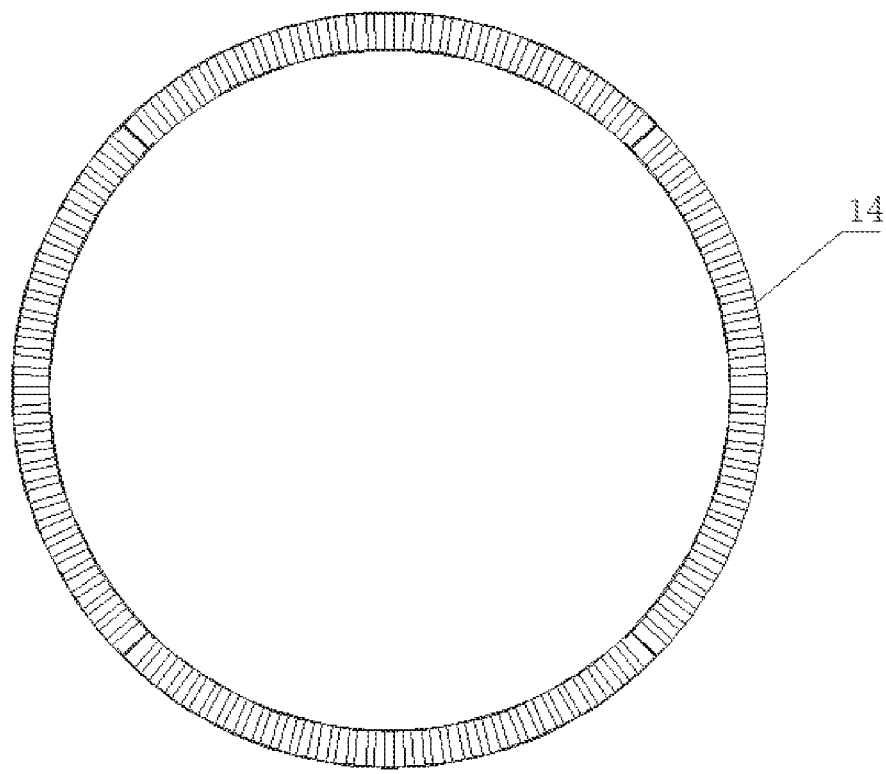
FIG. 21 illustrates a structural schematic diagram of a hollow pipe-sandwiching metal plate according to an embodiment of the present disclosure.

As shown in FIG. 21, a vacuum pipeline comprises a pipe body 14, the pipe body 14 is made of the four hollow pipe-sandwiching metal plates described in embodiment 8, and the metal plates are assembled into a pipeline structure, the cross section of which is circular.

The multiple metal plates are assembled into a whole by adopting the welding method, and are reinforced by bolts.

The vacuum pipeline can be used for hyperloop transportation, etc.

Figure 22:
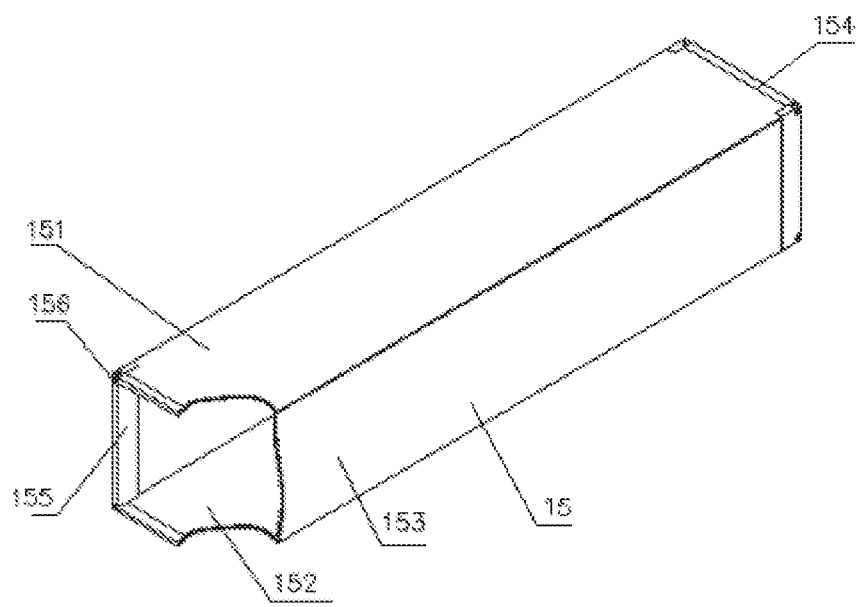
FIG. 22 illustrates a structural schematic diagram of a hollow pipe-sandwiching metal plate according to an embodiment of the present disclosure.

As shown in FIG. 22, a container body 15 of a container comprises a top plate 151, a bottom plate 152, side plates 153, and an end plate 154, one end of the container body 15 is provided with a container door, the two ends of the container body 15 are provided with frames 155, and the corners of the container body 15 are provided with hoisting holes 156.

At least one structure among the top plate 151, the bottom plate 152, the side plates 153, the end plate 154, the container door and the frames 155 is made of any one of the hollow pipe-sandwiching metal plates in embodiments 1-19. The top plate 151, the bottom plate 152, the side plates 153, the end plate 154, the container door and the frames 155 are connected by welding and are reinforced by bolts.

Figure 23:
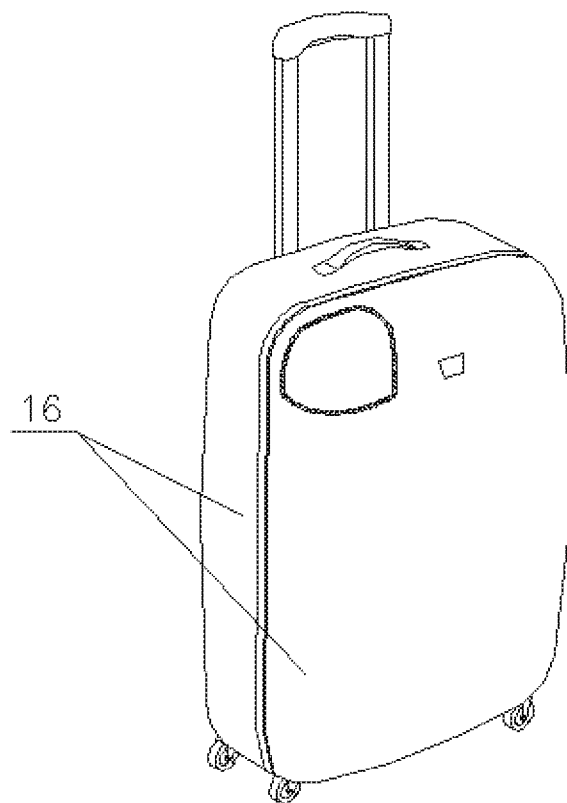
FIG. 23 illustrates a structural schematic diagram of a hollow pipe-sandwiching metal plate according to an embodiment of the present disclosure.

As shown in FIG. 23, a case body 16 of a suitcase is made of any one of the hollow pipe-sandwiching metal plates in embodiments 1-19.

The out layer of the hollow pipe-sandwiching metal plate is wrapped by a surface decorative material such as leather or paint.

Figure 24:
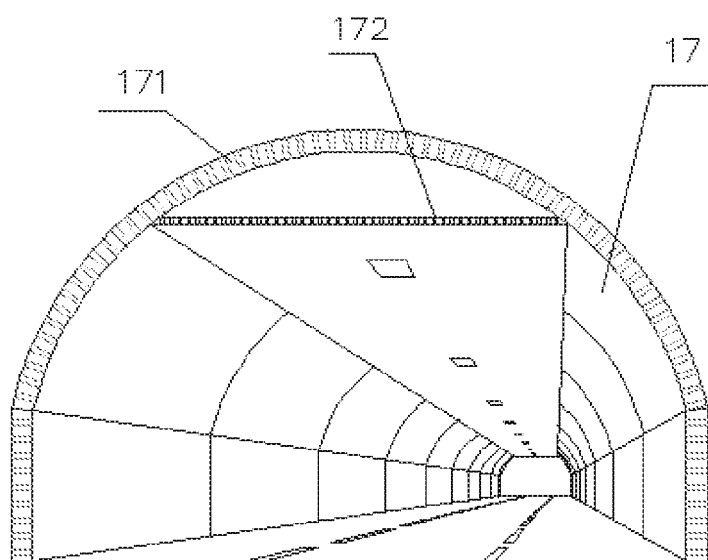
FIG. 24 illustrates a structural schematic diagram of a hollow pipe-sandwiching metal plate according to an embodiment of the present disclosure.

As shown in FIG. 24, a body 17 of a tunnel is made of a lining 171, a partition plate 172 is connected to the top in the body 17, and at least one structure among the lining 171 and the partition plate 172 is made of any one of the hollow pipe-sandwiching metal plates in embodiments 1-19. The multiple metal plates of the lining are welded and bolted to form the body of the tunnel, and the partition plate 172 is connected to the inner cavity of the lining 171 through bolts.

In some embodiments, the multiple hollow pipe-sandwiching metal plates described in any one of embodiments 1-19 are spliced to form a road, and can be connected through bolts, and thus, after being damaged, one metal plate can be dismantled directly and be replaced by a new metal plate, without affecting transportation.

Figure 25:
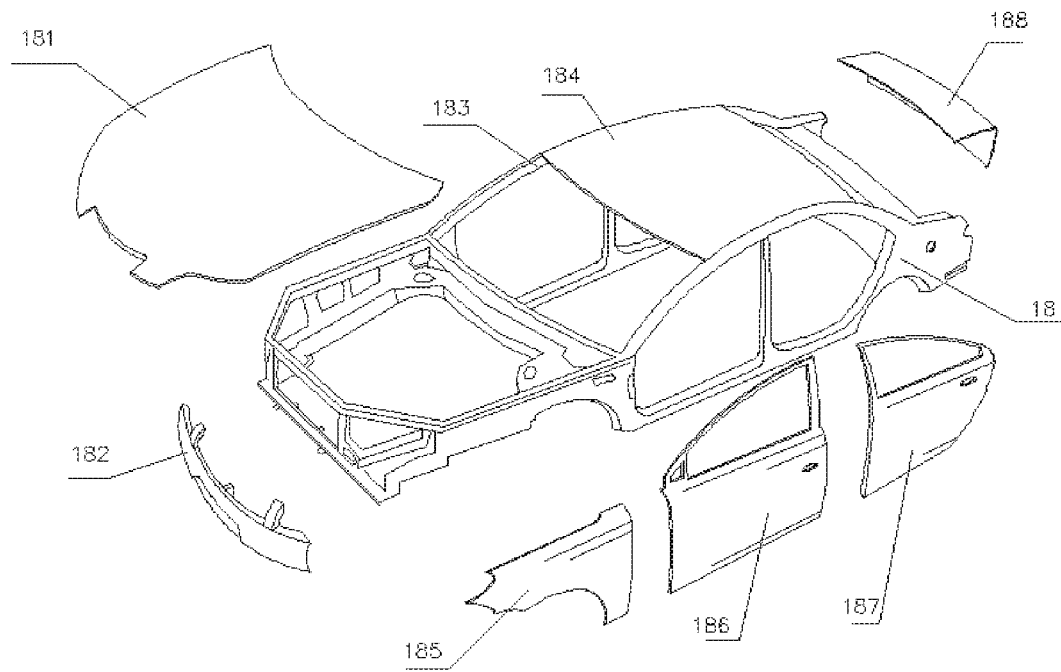
FIG. 25 illustrates a structural schematic diagram of a hollow pipe-sandwiching metal plate according to an embodiment of the present disclosure.

As shown in FIG. 25, a sedan comprises a sedan body 18, the sedan body comprises an engine hood 181, a front bumper 182, a frame 183, a roof 184, front fenders 185, front doors 186, back doors 187, and a trunk lid 188, wherein at least one structure among the engine hood 181, the front bumper 182, the frame 183, the roof 184, the front fenders 185, the front doors 186, the back doors 187 and the trunk lid 188 is made of any one of the hollow pipe-sandwiching metal plates in embodiments 1-19. The metal plates as well as the metal plates and the other parts of the sedan body can be connected by hinging, welding, bolting and other ways to form a sedan body structure.

Figure 26:
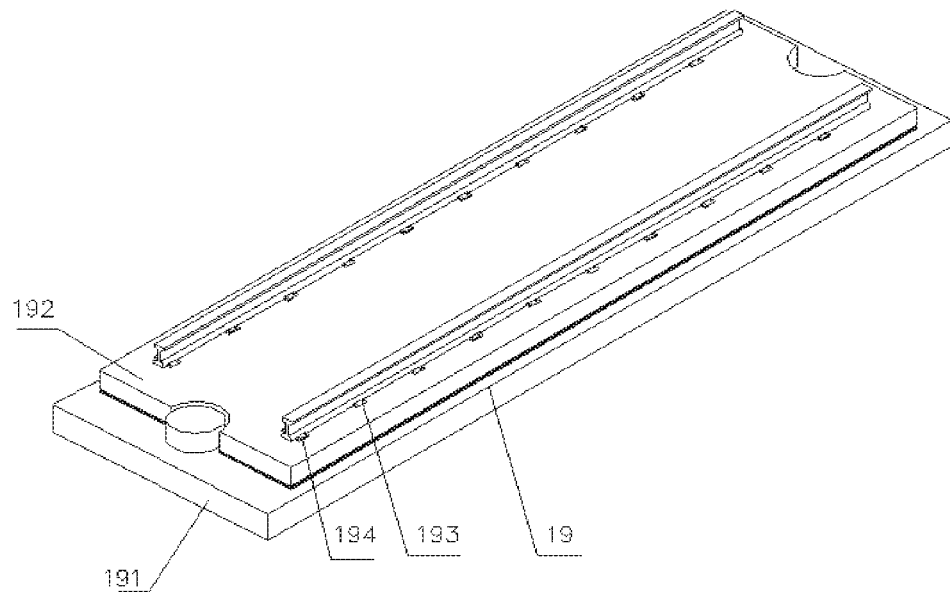
FIG. 26 illustrates a structural schematic diagram of a hollow pipe-sandwiching metal plate according to an embodiment of the present disclosure.

As shown in FIG. 26, a track body 19 of a ballastless track comprises a foundation 191, a track plate 192, and a fastener system 193, and the foundation 191 is connected to the track plate 192 through flexible adhesive 194.

The multiple hollow pipe-sandwiching metal plates in any one of embodiments 1-19 are spliced to form at least one structure of the foundation 191 and the track plate 192, and can be fixed by welding and/or bolting.

Figure 27:
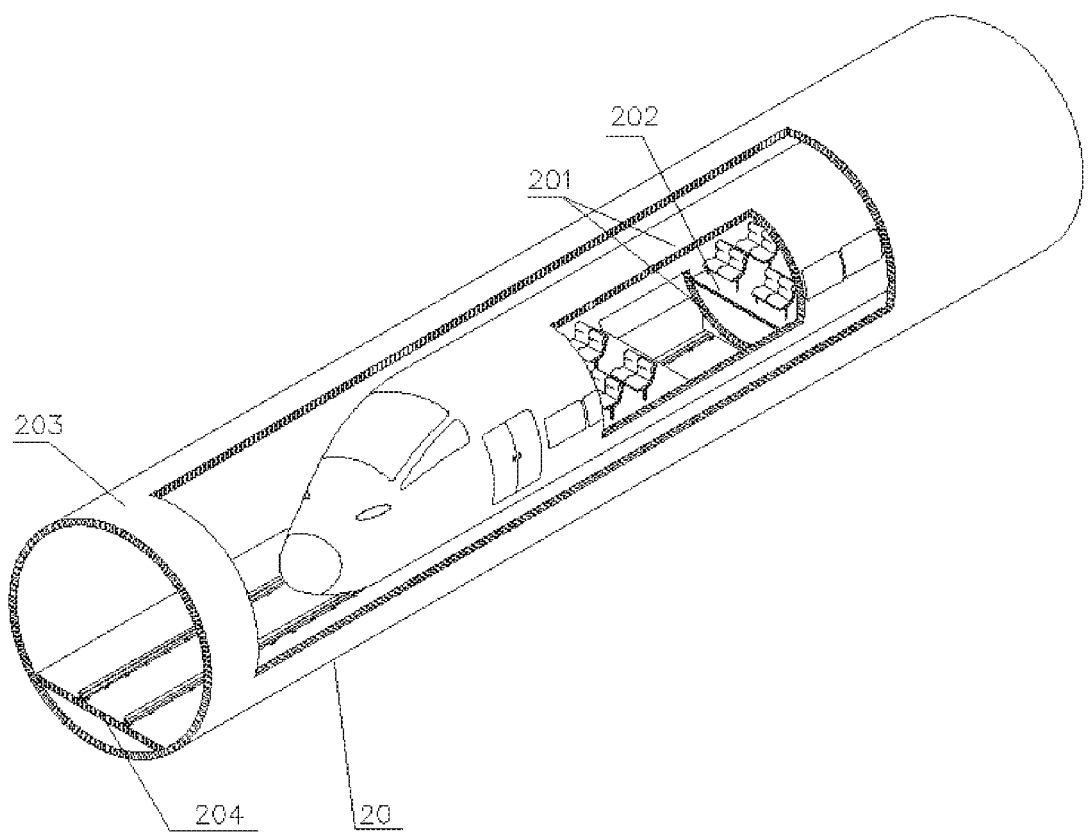
FIG. 27 illustrates a structural schematic diagram of a hollow pipe-sandwiching metal plate according to an embodiment of the present disclosure.

As shown in FIG. 27, a train body 20 of a rail train comprises carriage wall plates 201 and floors 202. When the train runs in a vacuum pipeline 203, a track plate 204 is arranged in the vacuum pipeline 203. At least one structure among the carriage wall plates 201, the floors 202 and the track plate 204 is made of any one of the hollow pipe-sandwiching metal plates in embodiments 1-19. The vacuum pipeline 203 is made of the hollow pipe-sandwiching metal plates described in embodiment 8. The metal plates as well as the metal plates and the other parts of the car body can be connected by hinging, welding, bolting and other ways to form a train body structure, a pipeline structure or a track plate structure.

Figure 28:
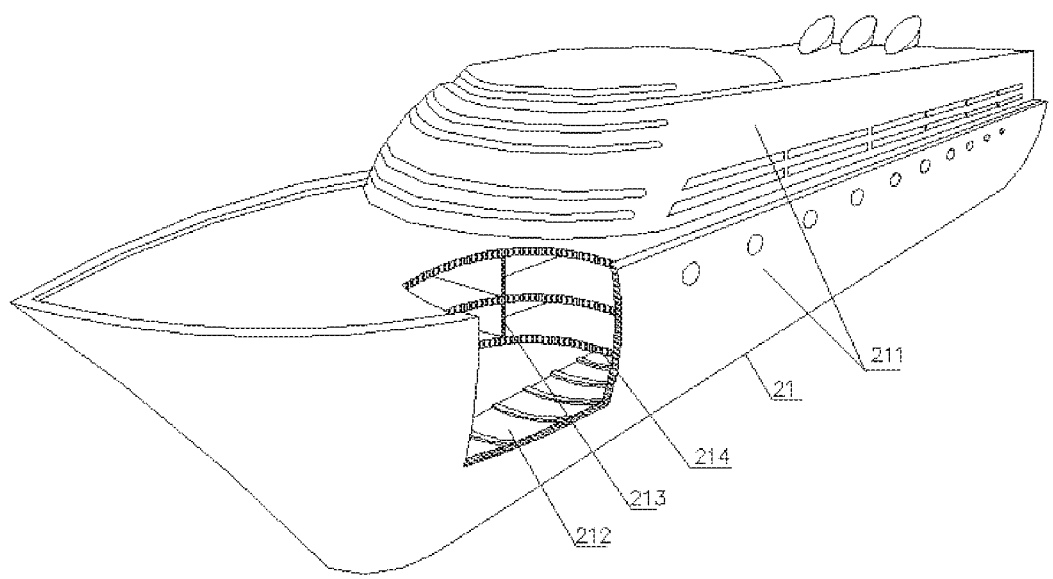
FIG. 28 illustrates a structural schematic diagram of a hollow pipe-sandwiching metal plate according to an embodiment of the present disclosure.

As shown in FIG. 28, a ship body 21 of a ship structure comprises a hull 211, reinforcing plates 212, compartment bulkheads 213, and reinforcing bulkheads 214, and at least one structure among the hull 211, the reinforcing plates 212, the compartment bulkheads 213 and the reinforcing bulkheads 214 is made of any one of the hollow pipe-sandwiching metal plates in embodiments 1-19. The metal plates as well as the metal plates and the other parts of the ship body can be connected by hinging, welding, bolting and other ways to form a ship body structure.

Figure 29:
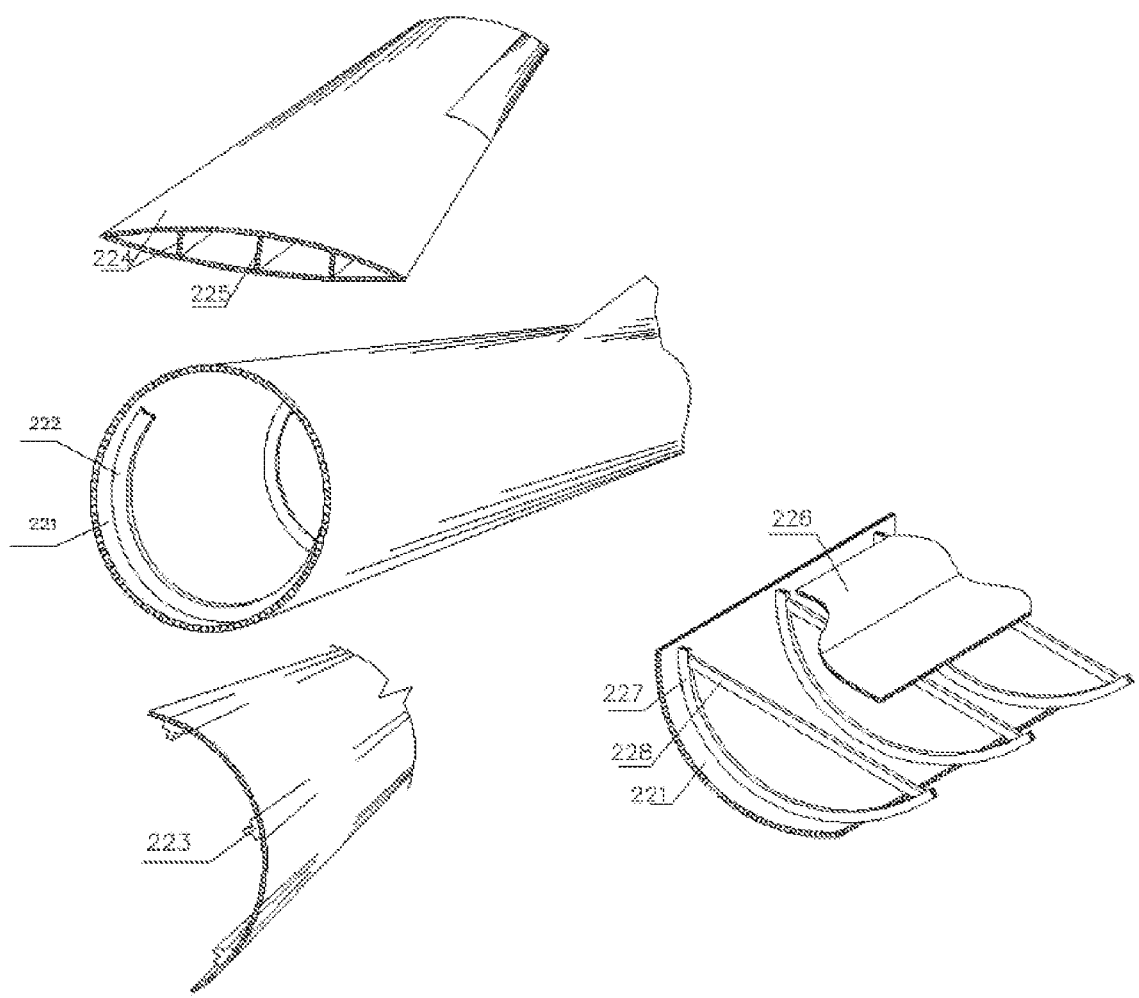
FIG. 29 illustrates a structural schematic diagram of a hollow pipe-sandwiching metal plate according to an embodiment of the present disclosure.

As shown in FIG. 29, a plane body 22 of a plane comprises a fuselage, wings, and a plane bottom, wherein the fuselage comprises a fuselage skin 221, and first bulkheads 222 and longerons 223 arranged in the inner cavity of the fuselage skin 221. Each wing comprises a wing skin 224 and longitudinal walls 225 arranged in the inner cavity of the wing skin. The plane bottom comprises a floor 226, the fuselage skin 221, and second bulkheads 227 and crossbeams 228 arranged in the inner cavity of the fuselage skin.

At least one structure among the fuselage skin 221, the first bulkheads 222, the longerons 223, the wing skins 224, the longitudinal walls 225, the floor 226, the second bulkheads 227 and the crossbeams 228 is made of any one of the hollow pipe-sandwiching metal plates in embodiments 1-19. Normally, the plane body is completely of an arc-shaped structure, and is preferably made of the hollow pipe-sandwiching metal plates described in embodiment 8.

The metal plates as well as the metal plates and the other parts of the plane body can be connected by hinging, welding, bolting and other ways to form the plane body structure.

Figure 30:
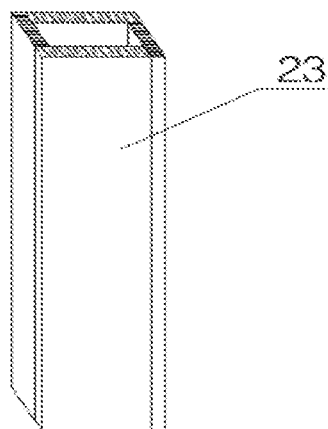
FIG. 30 illustrates a structural schematic diagram of a hollow pipe-sandwiching metal plate according to an embodiment of the present disclosure.

As shown in FIG. 30, a column body 23 of a building bearing column consists of the four hollow pipe-sandwiching metal plates in any one of embodiments 1-19; and the four metal plates define a square shape, and are connected with one another to form the building bearing column.

The metal plates can be connected by welding, bolting or another way.

Those skilled in the art can make various modifications and variations on the present disclosure without departing from the spirit and scope of the present disclosure. Thus, if these modifications and variations of the present disclosure belong to the scope of the claims of the present disclosure and its equivalent techniques, then the present disclosure also includes these modifications and variations.

What is claimed is:

1. A hollow pipe-sandwiching metal plate, comprising:

a first panel formed from metal;

a second panel formed from metal;

a plurality of hollow pipes between the first panel and the second panel, wherein at least one end of each hollow pipe includes a flange connected to one of the first panel or the second panel by a brazing compound; and a plurality of elongated brazing filler metal pieces disposed among the plurality of hollow pipes, wherein the plurality of elongated brazing filler metal pieces divide the plurality of hollow pipes into groups of hollow pipes, each hollow pipe in a group connected to the same elongated brazing filler metal piece, and wherein through gas passages are arranged among the groups of hollow pipes.

2. The hollow pipe-sandwiching metal plate of claim 1, wherein a section shape of each hollow pipe is a circle or an ellipse or an N-sided polygon, wherein N is greater than or equal to 3.

3. The hollow pipe-sandwiching metal plate of claim 1, wherein the first panel and the second panel are flat panels or curved panels, or one panel is a flat panel, and the other panel is a curved panel.

4. The hollow pipe-sandwiching metal plate of claim 1, wherein a material of the first panel and/or the second panel is a stainless steel, carbon steel, titanium or copper alloy plate; or a material of the hollow pipes is a stainless steel, carbon steel, titanium or copper alloy plate.

5. The hollow pipe-sandwiching metal plate of claim 1, wherein the hollow pipes are connected to the first panel and the second panel through the plurality of elongated brazing filler metal pieces by brazing, and wherein the plurality of elongated brazing filler metal pieces is formed from one of copper, aluminum, tin or alloy.

6. The hollow pipe-sandwiching metal plate of claim 1, wherein the plurality of elongated brazing filler metal pieces is laid directly or arranged in a form of loops between the hollow pipes and the first panel and between the hollow pipes and the second panel.

7. The hollow pipe-sandwiching metal plate of claim 1, wherein the hollow pipes include gas holes.

8. The hollow pipe-sandwiching metal plate of claim 1, further comprising:
a thermal insulation material arranged in inner cavities of the hollow pipes and/or between adjacent hollow pipes.

9. The hollow pipe-sandwiching metal plate of claim 1, further comprising:
a border arranged on at least one of a circumference of the first panel and/or the second panel.

10. The hollow pipe-sandwiching metal plate of claim 1, wherein the plurality of elongated brazing filler metal pieces include holes corresponding to positions of the hollow pipes, and edges of the holes include limiting structures for limiting the hollow pipes.

11. The hollow pipe-sandwiching metal plate of claim 10, wherein the limiting structures are flanges which extend out from the plurality of elongated brazing filler metal pieces along the edges of the holes, and wherein the holes limit the hollow pipes by means of the flanges.

12. The hollow pipe-sandwiching metal plate of claim 10, wherein the plurality of elongated brazing filler metal pieces is shaped like a sheet or a strip.

13. The hollow pipe-sandwiching metal plate of claim 10, wherein the plurality of elongated brazing filler metal pieces comprises a limiting portion comprising limiting projections extending outwardly along an edge of one hole and a flange extending out along the edge of the hole, wherein the holes limit the hollow pipes by the flanges, and stick the hollow pipes by the limiting projections.

14. A hollow pipe-sandwiching metal plate, comprising:
a first panel formed from metal;
a second panel formed from metal;
a plurality of hollow pipes between the first panel and the second panel, wherein:
both ends of each hollow pipe includes a flange,
each of the hollow pipes is connected to the first panel and the second panel by a corresponding flange, and
the corresponding flange is connected to one of the first panel and the second panel by a brazing compound, and
a plurality of elongated brazing filler metal pieces disposed among the plurality of hollow pipes, wherein the plurality of elongated brazing filler metal pieces divide the plurality of hollow pipes into groups of hollow pipes, each hollow pipe in a group connected to the same elongated brazing filler metal piece, and wherein through gas passages are arranged among the groups of hollow pipes.

15. A hollow pipe-sandwiching metal plate, comprising:
a first panel formed from metal;
a second panel formed from metal;
a plurality of hollow pipes between the first panel and the second panel, wherein:
both ends of each hollow pipe includes a flange,
each of the hollow pipes is connected to the first panel and the second panel by a corresponding flange, and
the corresponding flange is connected to one of the first panel and the second panel by a brazing compound, and
a plurality of elongated brazing filler metal pieces disposed among the plurality of hollow pipes, wherein the plurality of elongated brazing filler metal pieces divide the plurality of hollow pipes into groups of hollow pipes, each hollow pipe in a group connected to the same elongated brazing filler metal piece, and wherein through gas passages are arranged among the groups of hollow pipes
wherein the hollow pipe-sandwiching metal plate is used as a material for a building structure, a vehicle, a ship, an aircraft, aerospace equipment, a container, a bridge, a road, a tunnel, a railway foundation, furniture, a culvert, a vacuum pipeline or a case.

* * * * *